United States Patent [19]

Young et al.

[11] Patent Number: 5,386,540
[45] Date of Patent: Jan. 31, 1995

[54] METHOD AND APPARATUS FOR TRANSFERRING DATA WITHIN A COMPUTER USING A BURST SEQUENCE WHICH INCLUDES MODIFIED BYTES AND A MINIMUM NUMBER OF UNMODIFIED BYTES

[75] Inventors: Randolph G. Young, Simpsonville; James L. Bradshaw, Central; Bobby W. Batchler, Easley; Barry C. Sudduth, Clemson; Craig A. Walrath, Easley, all of S.C.

[73] Assignee: NCR Corporation, Dayton, Ohio

[21] Appl. No.: 98,763

[22] Filed: Jul. 28, 1993

Related U.S. Application Data

[63] Continuation of Ser. No. 761,538, Sep. 18, 1991.

[51] Int. Cl.⁶ .......................... G06F 13/28
[52] U.S. Cl. ...................... 395/425; 364/260
[58] Field of Search ............. 395/400, 425; 364/200 MS File, 900 MS File; 371/40.1; 365/189, 189.01

[56] References Cited

U.S. PATENT DOCUMENTS

| | | | |
|---|---|---|---|
| 4,366,539 | 12/1982 | Johnson et al. | 364/200 |
| 4,779,232 | 10/1988 | Fukunada et al. | 365/189 |
| 4,797,813 | 1/1989 | Igarashi | 364/200 |
| 4,819,154 | 4/1989 | Stiffler et al. | 364/200 |
| 4,920,484 | 4/1990 | Ranade | 364/200 |
| 4,942,517 | 7/1990 | Cok | 364/200 |
| 4,951,193 | 8/1990 | Muramatsu et al. | 364/200 |
| 4,959,777 | 9/1990 | Holman, Jr. | 364/200 |
| 4,965,717 | 10/1990 | Cutts, Jr. et al. | 364/200 |
| 4,969,088 | 11/1990 | McAuliffe et al. | 369/200 |
| 4,989,210 | 1/1991 | Scheuneman et al. | 371/90.1 |
| 5,001,625 | 3/1991 | Thomas et al. | 364/200 |
| 5,001,662 | 3/1991 | Baum | 364/757 |
| 5,043,943 | 8/1991 | Crisp et al. | 365/189.01 |
| 5,119,485 | 6/1992 | Ledbetter, Jr. et al. | 395/425 |
| 5,136,700 | 8/1992 | Thacker | 395/400 |
| 5,146,573 | 9/1992 | Sato et al. | 395/425 |

*Primary Examiner*—Joseph L. Dixon
*Assistant Examiner*—B. James Peikari
*Attorney, Agent, or Firm*—Paul J. Maginot

[57] ABSTRACT

A method of transferring data words that include data bytes within a computer having a main memory, a processor and a cache memory, with the processor being able to cause data words to be transferred in a burst mode from the cache memory to the main memory in one of a plurality of predetermined sequences, includes the following steps: (1) determining which data words of a group of data words located in the cache memory include data bytes which have been modified, (2) selecting one sequence of data words of the plurality of predetermined sequences of data words which includes (a) all of the data words of the group of data words that include data bytes which have been modified, and (b) a minimum number of data words of the group of data words that include no data bytes which have been modified, and (3) causing the one sequence of data words selected in the selecting step to be transferred in the burst mode from the cache memory to the main memory.

4 Claims, 3 Drawing Sheets

METHOD AND APPARATUS FOR TRANSFERRING DATA WITHIN A COMPUTER USING A BURST SEQUENCE WHICH INCLUDES MODIFIED BYTES AND A MINIMUM NUMBER OF UNMODIFIED BYTES

This is a continuation of application Ser. No. 07/761,538, filed Sep. 18, 1991.

The invention concerns an expedited system for transferring data from caches to memory in a computer.

BACKGROUND OF THE INVENTION

Two primary elements in a computer are the processor and memory. However, the processor can execute instructions faster than the memory can deliver the data. Consequently, the processor is held up by the slowness of memory. To solve this problem, a cache is added to the main memory. The cache is a small memory which is much faster (but more expensive per byte stored) than ordinary memory. The cache holds blocks of data and supplies it to the processor.

After the processor finishes with the block held in the cache, the modified data will probably be returned to the main memory. However, this return operation can cause excess traffic on the data bus, as the sequence of FIGS. 1A–1D will explain.

Assume that the cache line of 16 bytes, located at the bottom in FIG. 1A, is to be returned. If the data bus is 4 bytes wide, then a single transfer is not possible; the transfer will require the sequence of four steps indicated in FIGS. 1A, 1B, 1C, and 1D. Four bytes are transferred in each step. During these four steps, the bus cannot be used for other operations. It is possible that this traffic on the bus is unnecessary, because some of the 16 bytes in the line may not have been modified, and do not require return to the memory.

OBJECTS OF THE INVENTION

It is an object of the invention to provide a computer having improved ability to return data from cache to main memory.

SUMMARY OF THE INVENTION

A block of data is copied from main memory to a cache, where it will be modified. After modification, the cache version differs from the version in main memory. One form of the invention replaces the main memory version with the cache version, but replaces only those bytes which have been modified.

BRIEF DESCRIPTION OF THE DRAWINGS

FIG. 1A, FIG. 1B, FIG. 1C and FIG. 1D illustrate the problem of transferring a 16-byte data line using a 4-byte bus.

DETAILED DESCRIPTION OF THE INVENTION

Figure 1A:
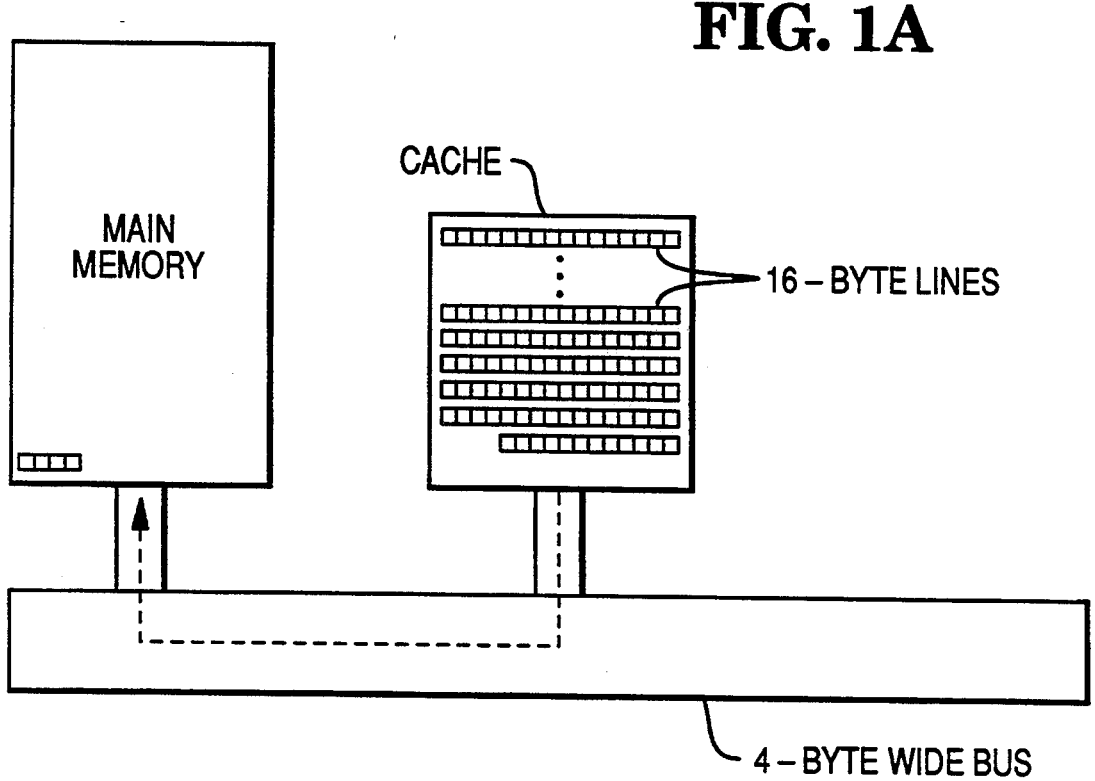
Figure 1A:
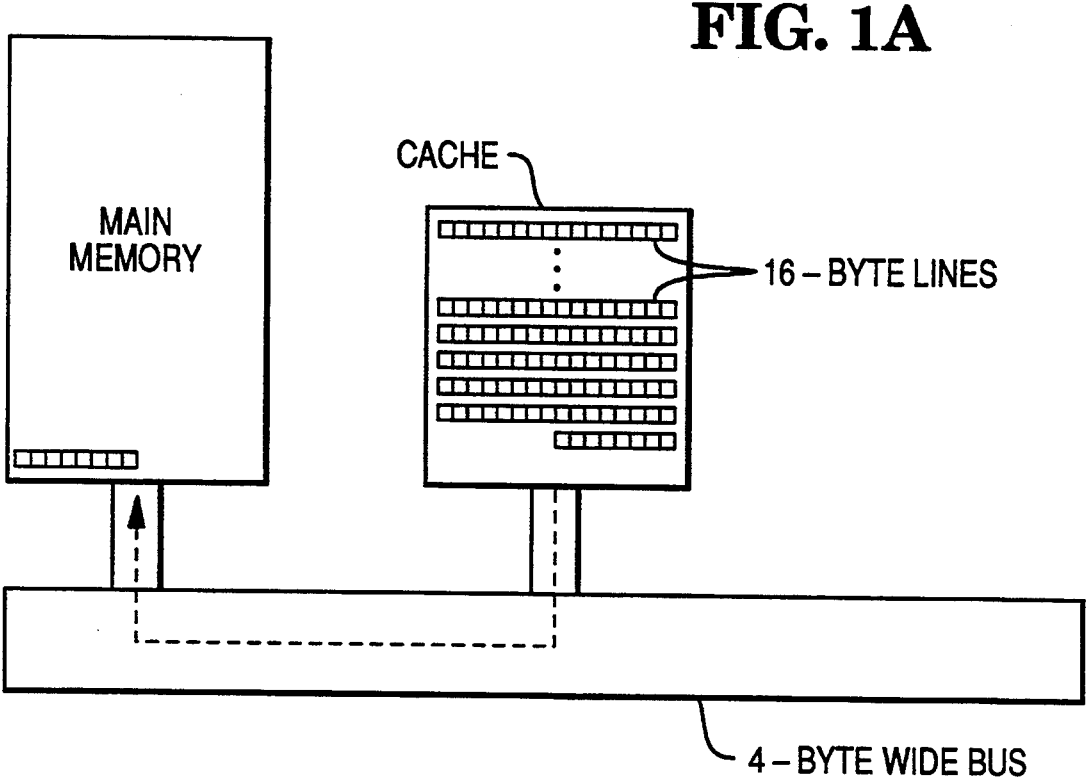
Figure 1C:
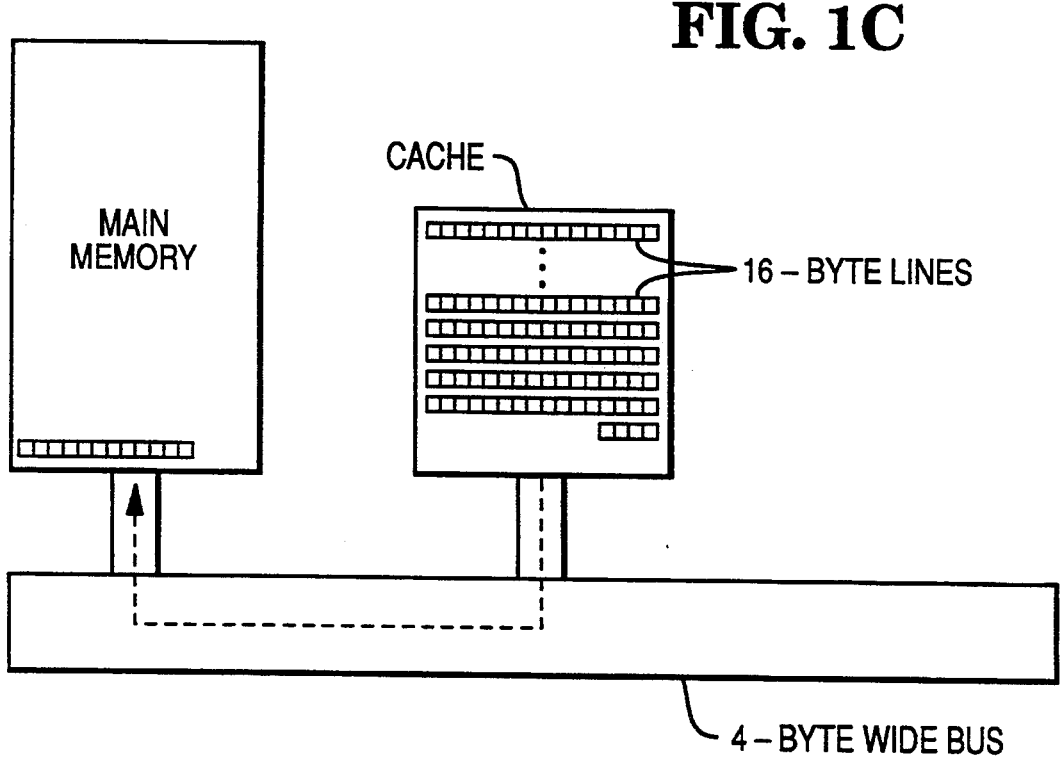
Figure 1D:
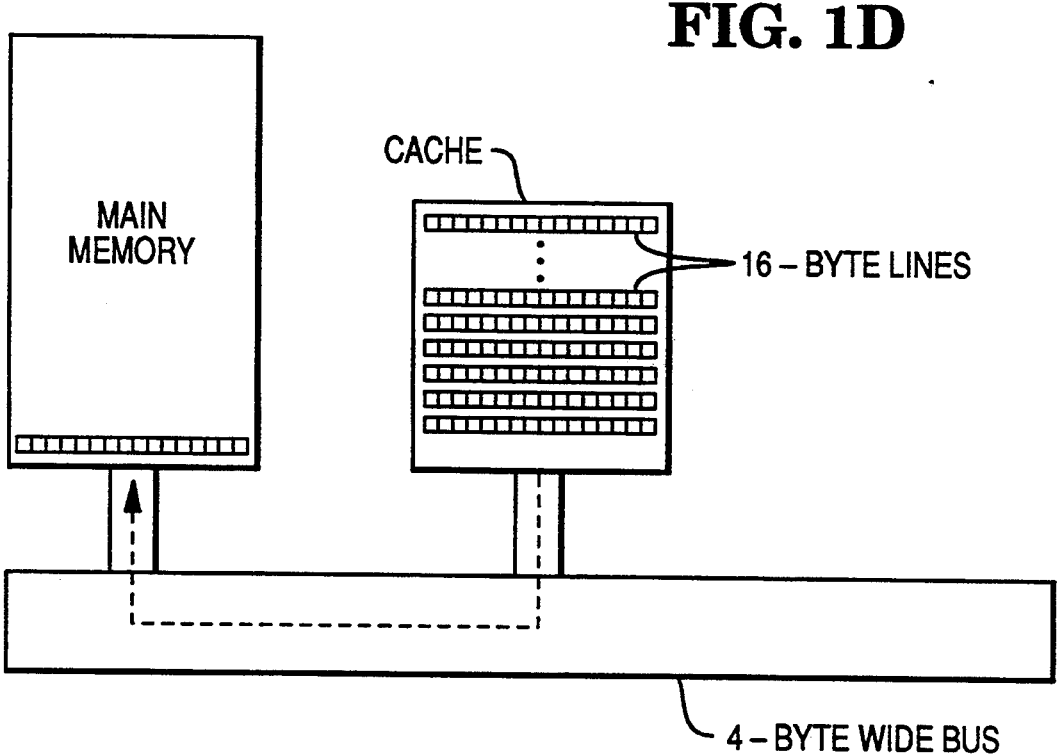

Microprocessors have a mode of operation called "burst mode," in which a large block of data is rapidly written to a group of consecutive addresses. The consecutive nature of the addresses allows faster writing, because transmission of the addresses is simplified: once the starting address is specified, mere incrementation is required thereafter. In contrast, for a non-burst transfer, in general, an entire address must be transferred along with each word of data.

For example, in a memory of 1 Megabyte capacity, the address word is 20 bits long. To load 16 bytes of data into the memory, it is clearly faster to transmit a single 20-bit word (the starting address), and then increment the address by one, 15 times, rather than to transmit sixteen separate 20-bit addresses.

The invention utilizes burst mode to reduce bus traffic, as the following example illustrates.

EXAMPLE

Invention Transfers Only (A) The Modified Bytes, Plus (B) Enough Other Bytes to Support Burst The data bits in cache are commonly grouped into "lines." Assume that one line contains 128 bits, (i.e., 16 bytes). Assume further that the data bus connecting between the cache and main memory is 32 bits, or 4 bytes, wide. (The four-byte word carried by the data bus is called a double-word, or d-word.) Thus, as described in the Background, writing a full line of data will take four steps, each step using the full capacity (four bytes) of the data bus.

However, the invention writes only those bytes in the cache line which have been modified. (The invention uses a processor, or controller, for transferring the data out of the cache and into memory, which is different from the processor associated with the cache. However, in principle, the invention could direct the latter processor to perform the transfer.) For example, assume that the 16-byte line is this:

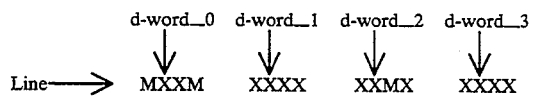

```
            d-word_0  d-word_1  d-word_2  d-word_3
               ↓         ↓         ↓         ↓
Line ──>     MXXM      XXXX      XXMX      XXXX
```

The X's and M's each indicate a byte. Each X indicates a non-modified byte, and each M indicates a modified byte. In this example, only two d-words (0 and 2) need to be written to main memory, because the d-words (1 and 3) contain non-modified bytes exclusively.

However, it is not possible to write these two particular d-words (0 and 2) exclusively, without others, using a single burst. The reason is that, from a simplistic point of view, in burst mode, the processor writes to a sequence of addresses. D-words 0 and 2 do not have sequential addresses in main memory, but are separated by d-word_1 (or d-word_3, as will become clear later). Thus, to use a single burst will require writing an extra d-word, namely, the intervening d-word_1.

Nevertheless, this burst-write of a partial line is still faster than burst-writing the entire line of four bytes.

Four Burst Sequences are Possible

The invention transfers data from a cache to main memory in one of the following sequences. (These burst sequences are consistent with those used by the Intel ® family of 1486 processors in their read operations.)

Burst sequence 0: d-word_0 then 1 then 2 then 3;
Burst sequence 1: d-word_1 then 0 then 3 then 2;
Burst sequence 2: d-word_2 then 3 then 0 then 1:
Burst sequence 3: d-word_3 then 2 then 1 then 0.
Further, the invention truncates the sequence, if required.

"Truncation" is defined as transmitting the first d-word in one of the sequences, but dropping either (i) the last one, (ii) the last two, or (iii) the last three d-words in the sequence. That is, in a truncation, some of the trailing d-words are dropped. (Dropping zero trailing d-words can be viewed, technically, as a truncation.) For example, in burst sequence 2 (truncated) the following combinations are possible:

d-word_2 then 3 then 0 then 1 OR
d-word_2 then 3 then 0.
d-word_2 then 3 OR
d-word_2.

However, the following is not a possible truncation with Burst sequence 2:

d-word_2 then 0 because this sequence does not eliminate either (i) the last one, (ii) the last two, or (iii) the last three d-words in the sequence. Instead, this sequence eliminates the last d-word (1), plus the third-to-last (3).

In order to transfer d-words 0 and 2, burst sequence would be chosen, as later explained, and the last d-word, (3), would be truncated. That is, a total of three d-words would be transmitted, namely, the desired d-words (0 and 2) plus a filler word (1).

How to Select the Burst Sequence

The invention decides which burst sequence to use, and how many d-words to truncate, by the following look-up table. (In practice, the invention identifies the sequence to be used by selecting the initial d-word. Selecting d-word_0 identifies burst sequence 0, and so on.)

Look-up Table

| Identity of Modified D-words | Burst Sequence Needed | Number of D-words to be Written |
|---|---|---|
| 0 | 0 | 1 |
| 1 | 1 | 1 |
| 2 | 2 | 1 |
| 3 | 3 | 1 |
| 0 & 1 | 0 | 2 |
| 0 & 2* | 0 | 3 |
| 0 & 3* | 1 | 3 |
| 1 & 2* | 0 | 3 |
| 1 & 3* | 1 | 3 |
| 2 & 3 | 2 | 2 |
| 0 & 1 & 2 | 0 | 3 |
| 0 & 1 & 3 | 1 | 3 |
| 0 & 2 & 3 | 2 | 3 |
| 1 & 2 & 3 | 3 | 3 |
| 0 & 1 & 2 & 3 | 0 | 4 |

The row printed in bold type refers to the Example. In this row, the "Identity of Modified D-words" is 0 & 2. The "Burst Sequence Needed" is 0, and the "Number of D-words to be written" is 3.

(The "Number of D-words to be written" indicates, indirectly, the number truncated: The number truncated is 4-minus-the-number-transmitted. The asterisks indicate situations when a filler d-word is required. Of course, the filler d-word is XXXX, containing unmodified data exclusively.)

Not All Bytes in each D-word are Written But Only the Modified Bytes

Figure 2:
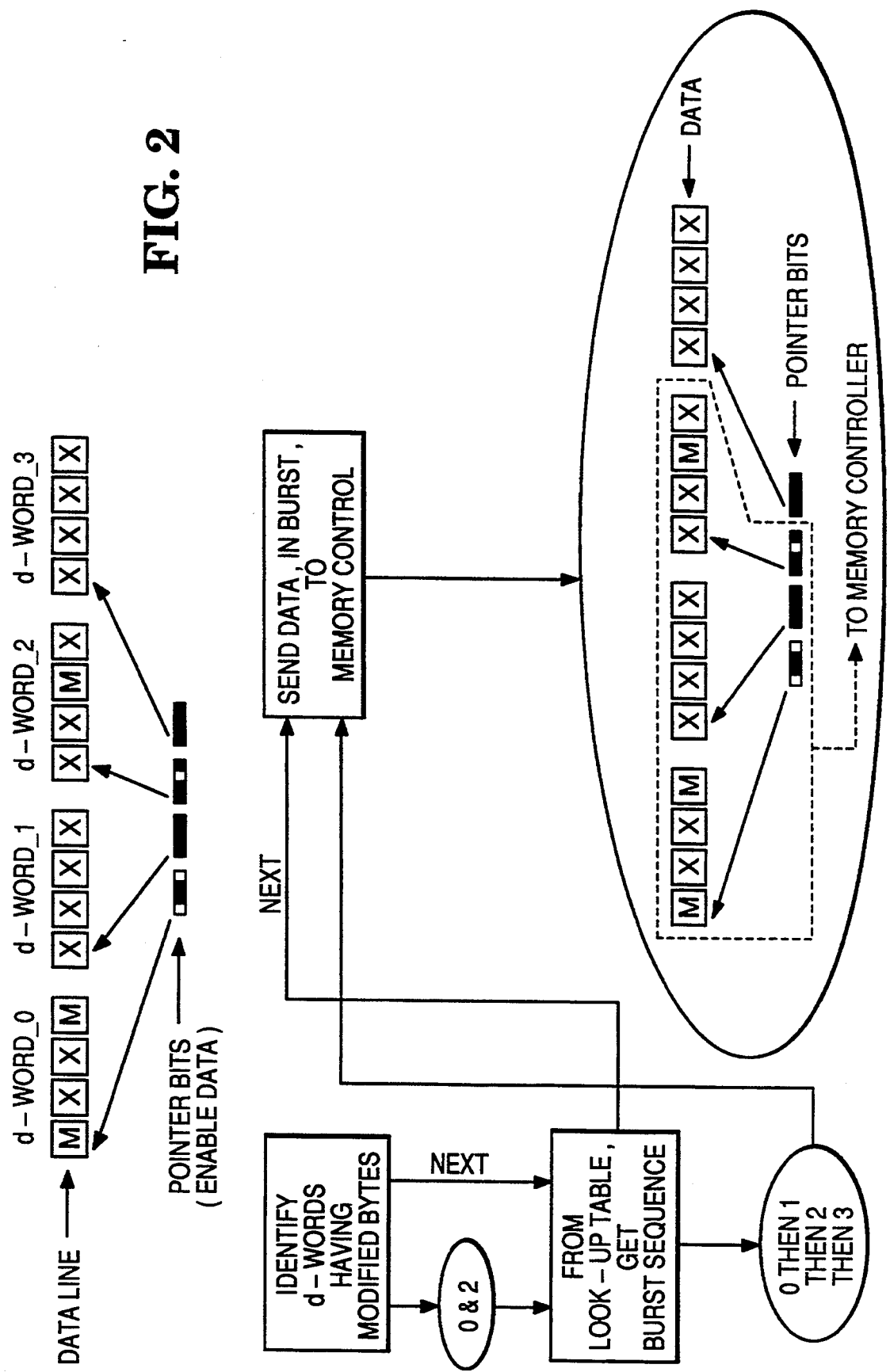
FIG. 2 illustrates one form of the invention.

The events just described are shown in FIG. 2. As indicated, a POINTER BIT is associated with each byte of the d-words. These POINTER BITS are generated by apparatus which detect the writing of a particular byte into cache, and, in response, store a POINTER BIT at a location associated with the byte. (For each line of 16 bytes, 16 pointer bits, or two bytes, are needed. The POINTER BITS are indicated by solid and empty cells: an empty cell indicates a ZERO POINTER BIT and a dark cell indicates a ONE.) These pointer bits can be called "byte enable" data, because, at the time of burst-writing, the byte-enable data is sent to the memory controller, along with the d-words. The controller writes only the bytes which are enabled, and does not write the bytes which are disabled. Controllers which perform such tasks are known in the art.

In the example, the byte-enable data is the following:

| D-word | D-word Status | Byte Enable Data |
|---|---|---|
| 0 | MXXM | 0110 |
| 1 | XXXX | 1111 |
| 2 | XXMX | 1101 |

That is, for d-word 0, the first M has a byte-enable bit of 0. (The bytes are enabled by a zero signal.) The first X has a byte-enable bit of 1, and so on.

The byte enable data of 0110 (for d-word_0) tells the memory controller the following:

write the first byte (M),
do not write the second two bytes (X, X), and
write the last byte (M).
The concept is similar for the other two d-words.

Thus, even though both modified- and unmodified bytes (the M's and X's) are transmitted, only the modified bytes (the M's) are written.

Recapitulation

Therefore, when writing a line of cache data to main memory, the following procedure is taken:
1. Ascertain the identities of the d-words in the line which contain modified bytes. This can be done using the pointer bits in FIG. 2.
2. Use the Look-Up Table to ascertain which burst sequence to use (0, 1, 2, or 3).
3. Identify which bytes in the transmitted d-words are to be given ENABLE signals. This can be done using the pointer bits.
4. Transmit the following to the memory controller via a burst:
   the d-words containing the modified data and
   the byte enablement data for each d-word.

It is significant that the burst sequence is a minimal sequence: the burst sequence contains only the d-words which contain modified bytes plus, if necessary, a filler d-word.

Numerous substitutions and modifications can be undertaken without departing from the true spirit and scope of the invention. For example, the hardware which implements the procedures described can take numerous forms, including a dedicated microprocessor. Implementation of the concepts, such as use of the Look-Up Table, is straightforward, and known in the art. Further, such circuitry can be designed automatically, by commercially available computer systems, based on the technical data given in the above Specification.

As another example, a 128-bit line size was discussed. However, other line sizes can be used, and the derivation of the corresponding Look-Up Table is a straightforward matter, based on the principles discussed herein.

As yet another example, the invention is not restricted to transfers from cache to main memory. It can apply to all types of data transfers.

The following texts are incorporated by reference:

Vranesic & Zaky, *Microcomputer Structures*, (Holt, Rhinehart & Winston 1989), ISBN 0-03-009739-8.

Willis, *Computer Architecture and Communications* (TAB Books 1986), ISBN 0-8306-7870-0.

Bartree, *Digital Computer Fundamentals* (McGraw-Hill 1985), ISBN 0-07-003899-6.

Mano, *Computer Engineering—Hardware Design* (Prentice Hall 1988), ISBN 0-13-162926-3.

Brookshear, *Computer Science, an Overview* (Benjamin Cummings 1991), ISBN 0-8053-0264-6.

Hayes, *Computer Architecture and Organization* (McGraw-Hill 1988), ISBN 0-07-027366-9.

Hamacher, Vrannesic & Zaky, *Computer Organization* (McGraw-Hill 1990), ISBN 0-07-025685-3.

What is desired to be secured by Letters Patent is the Invention as defined in the following claims.

We claim:

1. A method of transferring data words which include data bytes in a computer having a main memory and a processor with an associated cache memory, with the processor being able to cause data words to be transferred in a burst mode from the cache memory to the main memory in any one of a plurality of predetermined sequences, comprising the steps of:
   a) identifying which data words of a group of data words in the cache contain data bytes which have been modified
   b) selecting a predetermined sequence of data words from the plurality of predetermined sequences of data words which includes (i) all of the data words of the group of data words which include data bytes which have been modified, and (ii) the lowest number of data words of the group of data words that include no data bytes which have been modified relative to the other predetermined sequences of data words of the plurality of predetermined sequences of data words; and
   transferring said sequence of data words selected in the selecting step in the burst mode from the cache memory to the main memory.

2. A method of transferring data in a computer having a memory and a processor with an associated cache in which data is grouped into lines, each line having a number of data words which include data bytes, and the processor being able to cause data words to be sent in a burst mode from the cache to the memory in any one of a plurality of sequences, comprising the following steps:
   a) identifying which data words of a group of data words include data bytes which have been modified
   b) selecting a sequence of data words from the plurality of predetermined sequences of data words which includes (i) all of the data words of the group of data words which include data bytes which have been modified, and (ii) the lowest number of data words of the group of data words that include no data bytes which have been modified relative to the other sequences of data words of the plurality of predetermined sequences of data words; and
   c) sending said sequence of data words from the cache to the memory in the burst mode.

3. A method of transferring data words which include data bytes in a computer having a memory, a memory controller and a cache, with the data words being sent in a burst mode from the cache to the memory in any one of a plurality of predetermined sequences, comprising the following steps:
   a) identifying which data words of a group of data words in the cache contain data bytes which have been modified;
   b) selecting a predetermined sequence of data words from the plurality of predetermined sequences of data words which includes (i) all of the data words of the group of data words which include data bytes which have been modified, and (ii) the lowest number of data words of the group of data words that include no data bytes which have been modified relative to the other predetermined sequences of data words of the plurality of predetermined sequences of data words;
   c) sending said predetermined sequence of data words from the cache to the memory controller in the burst mode;
   d) identifying which data bytes of data words of said predetermined sequence of data words have been modified; and
   e) transferring data bytes identified in step (d) from the memory controller to the memory.

4. A method of transferring data words which include data bytes within a computer having a main memory, a processor and a cache memory, with the processor being able to cause data words to be transferred in a burst mode from the cache memory to the main memory in any one of a plurality of predetermined sequences, comprising the steps of:
   determining which data words of a group of data words located in the cache memory include data bytes which have been modified;
   selecting a sequence of data words of the plurality of predetermined sequences of data words which includes (a) all of the data words of the group of data words that include data bytes which have been modified, and (b) the lowest number of data words of the group of data words, relative to the other sequences of data words of the plurality of predetermined sequences of data words, that include no data bytes which have been modified; and
   causing the sequence of data words selected in the selecting step to be transferred in the burst mode from the cache memory to the main memory.

* * * * *